June 6, 1944. G. A. SMITH 2,350,371

BORE HOLE LOGGING APPARATUS

Filed July 23, 1940

WITNESS:
Rob't R. Mitchel.

INVENTOR
George A. Smith
BY
Busser & Harding
ATTORNEYS.

Patented June 6, 1944

2,350,371

UNITED STATES PATENT OFFICE 2,350,371

BOREHOLE LOGGING APPARATUS

George A. Smith, Philadelphia, Pa., assignor to Sperry-Sun Well Surveying Company, Philadelphia, Pa., a corporation of Delaware Application July 23, 1940, Serial No. 347,079

8 Claims. (Cl. 181—0.5)

This invention relates to geophysical prospecting, and more particularly to the logging of the strata traversed by a bore hole to determine the nature and boundaries thereof. The various strata which make up the portion of the crust of the earth which has been penetrated by bore holes vary quite considerably in their physical constants. Advantage has been taken of this to determine the boundaries and nature of strata traversed by bore holes to secure information of interest, for example, in the production of oil, since the knowledge of the disposition of strata traversed by a bore hole may determine the operations to be undertaken with respect to that bore hole or what should be done in the way of further development of the region containing the logged hole by way of the drilling of other holes. The use of such methods is particularly important in the boring of wells for oil.

It is the broad object of the present invention to provide a method and apparatus for the logging of bore holes by taking advantage of the differences in elastic properties of the strata traversed. Specifically, it is the object of the present invention to determine the properties of the strata by having the strata affect the operation of an oscillator producing acoustic waves therein.

A further object of the invention is the provision of an apparatus capable of determining the presence of strata of relatively slight vertical thickness.

These and other objects of the invention, particularly relating to details, will become apparent from the following description, read in conjunction with the accompanying drawing, in which.

Figure 1:
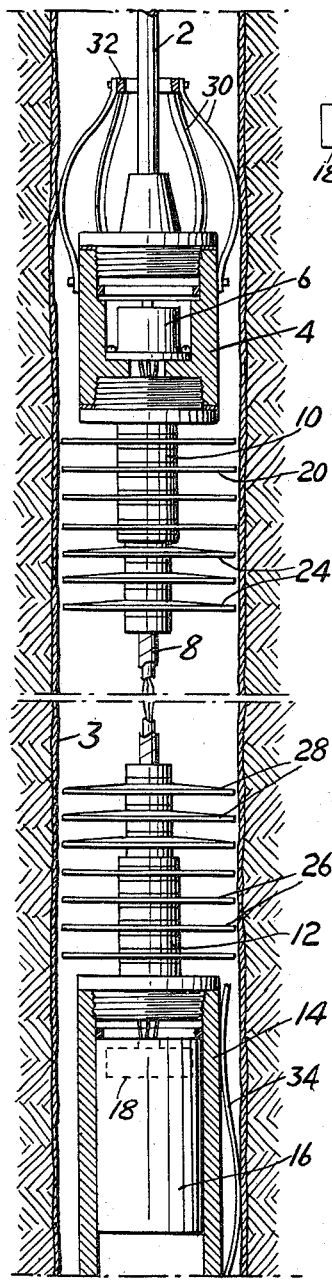
Figure 1 is a vertical section through a portion of an apparatus designed to determine the nature of strata penetrated by a bore hole by response to the velocity of transmission of elastic waves through the strata.

Referring first to Figure 1, the exploring apparatus shown in that figure is supported by means of a cable 2 from the surface for movement within the bore hole which generally is lined with mud as indicated at 3. If recording within the apparatus is effected, this cable may be a solid one. On the other hand, if recording at the surface is utilized or if control from the surface is desirable, then one or more conductive strands may extend through the cable communicating with parts in the apparatus and with suitable recording or controlling means at the surface.

The uppermost portion of the apparatus comprises a casing 4 in which is located a sound reproducing device 6 which may take the form of a loud speaker motor arranged to drive a suitable diaphragm for the introduction of sound waves into the liquid and strata surrounding the casing. This loud speaker arrangement may be of any convenient form, desirably capable of delivering a considerable amount of acoustic power.

Extending downwardly from the casing 4 is a cable 8 enclosing a number of insulated conductors for the purpose hereafter described. This cable passes at its upper end through a plug connected to the casing 4 and having a metallic cylindrical extension indicated at 10, provided with a series of metallic discs indicated at 20. These discs are so arranged as to extend peripherally adjacent the walls at the bore hole through which the apparatus is moving and are designed to provide the maximum transmission of sound from the speaker 6 into the ground. Similarly the lower end of the cable passes through a metallic extension 12 of the plug closing the upper end of a lower casing 14. Metallic discs 26 carried by the extension 12 are designed to promote the transmission of sound waves from the earth to the lower casing 14 and thence to the microphone 18 which is associated with suitable amplifying, recording and power apparatus indicated at 16, and later described in detail. Between the discs 20 and 26 it is desirable to attenuate as much as possible any waves tending to pass directly through the mud in the bore hole from the loud speaker to the microphone. To this end, the cable 8 is desirably made as indirect, metallically, as possible, namely, by the provision of a spiral armour, and is furthermore surrounded by sound attenuating devices in the form of discs 24 and 28 of rubber or similar material which will act to provide a substantial sound insulator and prevent to as great degree as possible any direct transmission of sound. Thus the microphone receives primarily sound passing from the loud speaker through the strata surrounding the hole.

Such transmission as occurs through the mud, however, is rendered not particularly serious by reason of the use of wave filters as hereinafter described.

Desirably, the entire apparatus should be maintained as nearly as possible symmetrically arranged with respect to the walls of the bore hole. Accordingly, there are provided spring members indicated at 30 joined to the upper casing 4 and at their free ends to a ring 32 tending to hold the upper casing spaced from the walls of the bore hole. Similar spring member 34 may be provided on the outside of the lower casing to effect a similar result.

Within the interior of the apparatus there is provided means for feeding back to the loud speaker, in an amplified condition to drive the loud speaker, the impulses received by the microphone 18. To effect this and secure the desired results in the apparatus, the output from the microphone is fed into an amplifier and band pass filtering arrangement indicated at 36. The amplifier is of the usual cascaded tube type, but particular care is taken in the inter-stage coupling to provide that the amplifier shall pass primarily only a narrow band of frequencies, depending upon the nature of the strata expected to be traversed and the characteristics of the apparatus.

Figure 2:
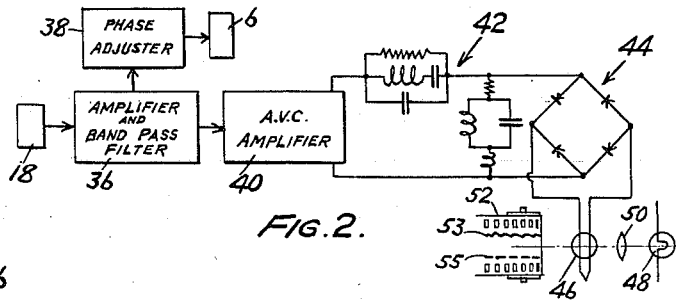
Figure 2 is a wiring diagram illustrating the electrical relationships of the various parts of the apparatus of Figure 1.

The output of the amplifier is indicated in Figure 2 as being fed to a phase adjuster indicated at 38. While this is indicated diagrammatically as a separate unit, it is obvious that the phase adjustment may be incorporated in the amplifier. The phase adjustment is primarily for the purpose of setting the apparatus and is desirable for reasons hereafter pointed out. The output of the phase adjustor is fed to the loud speaker 6.

The recording apparatus may be connected to one of the stages of the amplifier 36 and comprises an automatic volume control amplifier 40 designed to provide a substantially constant output level irrespective of substantial changes in the magnitude of its input and the frequency of its input. The output of this amplifier is fed to a filter arrangement indicated at 42, preferably comprising a series of sections of the type there indicated. The network provided at 42 is of a special well known type known as a corrective network. It is so designed that with a given terminal impedance it offers a constant resistance to the output of the amplifier 40 for all frequencies which are of interest. It also has a loss v. frequency characteristic which is very closely a straight line through the frequency range used, and in the particular case shown, the network is such that the loss at the lower frequencies will be greater than the loss at the higher frequencies. Desirably, a series of filter sections of this type are used so that the change of loss with frequency is quite high, or, in other words, so that the arrangement provides a quite sensitive frequency meter. The design of networks of this description will be found in K. S. Johnson's "Transmission Circuits for Telephonic Communication" published by D. Van Nostrand Company, New York, 1925, page 232 et seq.

The network 42 feeds a rectifier indicated at 44, the rectified output of which is fed to a mirror galvanometer, indicated at 46, designed to reflect a beam of light from a lamp 48 focused by means of a lens system, indicated at 50, upon a continuously moving photographic film indicated at 52 to produce a record curve such as indicated at 53. Such recording apparatus is well known in this art of well logging, and, if embodied in the logging apparatus, there is produced along side the curve 53 time markings 55, which may be translated into terms of depth through the medium of a record made at the surface indicating the times at which the logging apparatus reached various depths. The considerations involved, for example, are described in the application of John M. Pearson and George A. Smith Serial No. 63,558, filed February 12, 1936, now Patent Number 2,271,951, granted February 3 1942. Alternatively, the output of the rectifier 34 may be transmitted through cable 2 to the surface, in which case automatic depth markings may be recorded on a film such as 52 along with the response trace 53.

When the above described apparatus is set in operation and located within a bore hole, an impulse delivered by the loud speaker 6 will produce a sound wave the used portion of which will pass to the rock surrounding the bore hole thence downwardly through the rock to the position of the microphone 18, the diaphragm of which will be affected thereby. The impulse so received is amplified through the amplifier 36 and the phase adjustor 38 and will produce a second impulse of the loud speaker. The repetition of this will, of course, produce sustained oscillations having an acoustic path from the loud speaker to the microphone and an electrical path from the microphone to the loud speaker. The frequency of the oscillations so produced will depend upon the time taken for the passage of sound from the loud speaker to the microphone The shape of the travelling wave will depend primarily upon the mechanical arrangements of the apparatus, but will be approximately sinusoidal in form, and the amplifying filter system is preferably so arranged that substantially only a sine wave passes therethrough. In order to aid in obtaining a picture of the operation of this apparatus, the following approximate outline of what occurs may be considered, since from it the proper design of the parts of the apparatus may be understood.

Suppose the periodic displacement of the loud speaker diaphragm is represented by $f(t)$. Then if $a_1$ is an attenuation factor, the displacement of the rock surface directly opposite the loud speaker is given by $$a_1 f\left(t - \frac{m}{v_0}\right)$$

where $m$ is the effective spacing of the loud speaker from the rock and $v_0$ is the velocity of sound in mud. If $a_2$ is another attenuation factor, the displacement of the rock surface directly opposite the microphone is given by $$a_1 a_2 f\left(t - \frac{m}{v_0} - \frac{l}{v}\right)$$

where $l$ is the effective length of the sound path through the rock and $v$ is the velocity of sound in the rock. Similarly, the displacement of the microphone diaphragm is given by $$a_1 a_2 a_3 f\left(t - \frac{m+n}{v_0} - \frac{l}{v}\right)$$

where $n$ is the effective spacing of the microphone from the rock. Taking into account a lag $\theta_1$ in the microphone and a suitable factor $a_4$, the input to the amplifier is given by $$a_1 \ldots a_4 f\left(t - \frac{m+n}{v_0} - \frac{l}{v} - \theta_1\right)$$

In the amplifier, unlike the other elements of the system, the transmission is desirably made to depend on the frequency so that the amplification may introduce a factor $a_s\mu(f)$ where $\mu(f)$ represents the dependence on the form of the function, i. e., the frequency. Again assuming a lag, the amplifier output may be represented by $$a_1 \ldots a_s\mu(f)f\left(t-\frac{m+n}{v_0}-\frac{l}{v}-\theta_1-\theta_2\right)$$

Taking into account the lags, the displacement of the loud speaker diaphragm resulting from all the preceding factors may be represented by $$a_1 \ldots a_s\mu(f)f\left(t-\frac{m+n}{v_0}-\frac{l}{v}-\theta_1-\theta_2-\theta_3\right)$$

or, lumping the factors and lags in the electrical parts, by $$a\mu(f)f\left(t-\frac{m+n}{v_0}-\frac{l}{v}-\theta\right)$$

Obviously, the two expressions for the displacements must be identical, so that for the maintenance of sustained oscillations:

$$a\mu(f)f\left(t-\frac{m+n}{v_0}-\frac{l}{v}-\theta\right)=f(t)$$

The function, being periodic, may be expressed in the form of a Fourier series having terms of the form $A_s \cos(s\omega t+\phi_s)$, $s=1, 2 \ldots$ In view of conditions later discussed, $\mu(f)$ may be broken into components corresponding to the individual terms, each component being dependent upon frequency alone, so the equation may be written as a set of equations of the following form, since only terms of the same frequency may be equated:

$$a\lambda(s\omega) \cos\left[s\omega\left(t-\frac{m+n}{v_0}-\frac{l}{v}-\theta\right)+\phi_s\right]=$$

$$\cos(s\omega t+\phi_s)$$

Obviously, for this to be true, $$a\lambda(s\omega)=1$$

that is, the amplification for the periodicity $s$ must be such as to balance the total attenuation of the system if oscillations of that periodicity are to be sustained.

Secondly, the above equation must hold for all values of time so that $$s\omega\left(\frac{m+n}{v_0}+\frac{l}{v}+\theta\right)=2\pi p$$

where $p=1, 2 \ldots$

Considering the fundamental frequency only as sustaining oscillations, since damping of harmonics would be substantially greater than the damping of the fundamental and at any rate the amplifier is to be designed to suppress all but a narrow band of frequencies, the last equation becomes:

$$\left(\frac{m+n}{v_0}+\frac{l}{v}+\theta\right)f=p$$

in which $p=1, 2 \ldots$

Calling $$\frac{m+n}{v_0}+\frac{l}{v}=T$$

the transit time of the acoustic waves from the speaker to the microphone, $$(T+\theta)f=p$$

$$f=\frac{p}{T+\theta}$$

Since $\theta$ is small in an electrical apparatus, and may be made zero for the segregated band of frequencies by means of the phase changer, it will be seen that the frequencies possible for given conditions bear a harmonic relationship to each other. Since the values of $T$ for water and rock do not differ greatly, if other than a fundamental frequency is used, different harmonics due to rock and water paths may fall in the same range. Consequently the use of the fundamental frequency is desirable so that $$f=\frac{1}{T}$$

The above is not intended to be an accurate mathematical analysis of the operation, since various other factors enter. However, it is a close approximation from the standpoint of the matters which are of importance in design.

The first consideration is to prevent spurious oscillations such as would be produced by the direct transmission of waves through the cable or through the liquid in the bore hole from the loud speaker to the microphone. Oscillations produced by waves passing through any metallic connection would have a higher frequency than the frequency resulting from the transmission through rock and the band pass filters in the amplifier 36 are designed to eliminate the higher frequencies which would so result. Furthermore, it will be noted that by the use of a cable conta'ning no direct metallic connectors except the electrical connecting wires, which, furthermore, are sheathed with insulator so that waves passing through them are highly damped, the attenuation is quite high so that oscillations will not be maintained.

Similarly, the product $a\lambda(s\omega)$ is less than unity for the waves passing directly through the liquid not only because of the damping provided by the members 24 and 28, but also because the lower frequencies which would result from oscillation due to such transmission would be outside the band of frequencies passed by the amplifier.

Actually, the band of frequencies to be passed by the amplifier 36 may be relatively small, since the rocks which occur along the path of a bore hole do not differ greatly in their velocities of transmission of elastic waves. It will be noted that the phase adjustor 38 is effective to some extent to determine the frequency of oscillation and is provided for the purpose of originally setting the apparatus to secure frequencies within the range to be detected by the filter arrangement 42.

Figure 3:
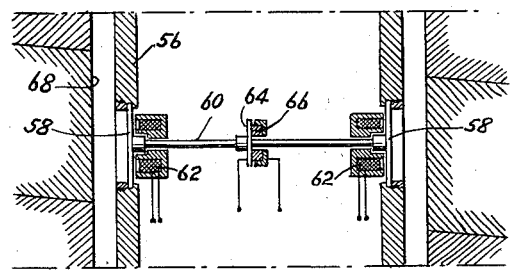
Figure 3 is a fragmentary vertical section through an alternative form of apparatus particularly designed for the detection of strata of slight thickness.

It will be evident that the apparatus just described is capable of detecting strata of only substantial thickness affording a path of substantial length for the waves passing between the loud speaker and the microphone. To detect strata of relatively small vertical thickness, the arrangement illustrated in Figure 3 may be used. This comprises a housing 56, of which only a small part is illustrated in Figure 3, which contains the sound generating apparatus as well as the amplifying and other apparatus which is not illustrated in that figure. Casing 56 is preferably provided with diammetrically opposite openings in which are secured diaphragms 58 capable of withstanding the mud pressures encountered and which are joined by means of a rod 60. Loud speaker motors indicated at 62 are arranged to drive the diaphragms, being connected in opposite electrical phase for this purpose. The connecting rod 60 carries the diaphragm 64 of a crystal or other microphone, indicated at 66. As will be pointed out presently, the microphone, through suitable amplifying and other devices, serves to energize the loud speakers 62.

Figure 4:
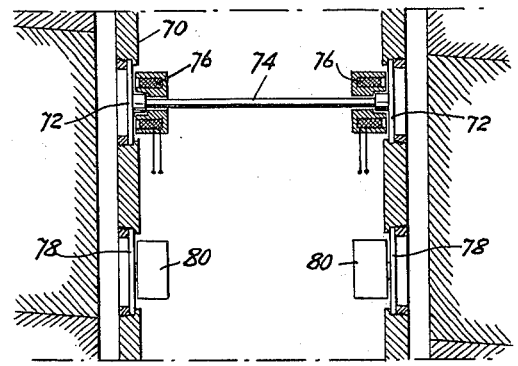
Figure 4 is a similar view of still another modified apparatus embodying the principles of the invention.

Before discussing the electrical arrangements of Figure 3, reference may be made to another pick up and loud speaker arrangement utilizing the same electrical connections. This arrangement, shown in Figure 4, also comprises a casing 70 similar to the casing 56 and housing the various operating and indicating devices, and is provided with loud speaker diaphragms 72 similar to 58 connected by a rod 74 and adapted to be driven by loud speaker motors 76. In the modification of Figure 4, however, instead of providing a pick up for the feed back arrangements on the rod 74, separate microphone diaphragms 78 are provided connected to microphones 80. Preferably, these diaphragms are located fairly close to the diaphragms 72 so that, as indicated in Figure 4, a single stratum of relatively small thickness may embrace both the loud speakers and microphones. So far as picking up thin strata is concerned, the two arrangements are essentially similar with the exception that thinner strata may be detected by the arrangement of Figure 3.

Figure 5:
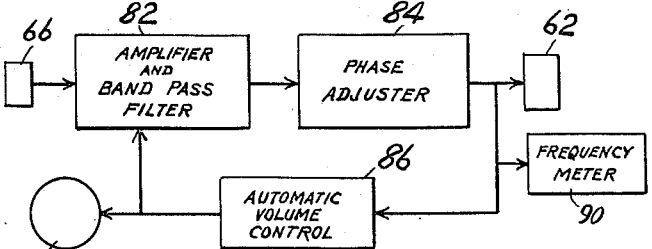
Figure 5 is a block diagram applicable to both the modifications of Figures 3 and 4 to show the electrical relationships of the parts thereof.

The wiring arrangement common to both Figures 3 and 4 is illustrated in Figure 5 with particular reference to its use in connection with the microphone 66 and loud speakers 62 of Figure 3. The output of the microphone 66 is fed to an amplifier embodying a band pass filtering arrangement indicated at 82. The output of this passes to the phase adjuster 84, which may in practice be embodied as part of the amplifier, and thence to the loud speakers 62, which, as indicated previously, are connected in opposite phase if they are to drive the diametrically opposite diaphragms 58. Connected to the output of the phase adjustor 84 is an automatic volume control, indicated at 86, which, by control of the amplifier 82, as indicated in the block diagram, maintains substantially constant the power input to the speakers 62. Connected also to the output of the phase adjuster is a frequency meter, which may be of the type illustrated in Figure 2, feeding into automatic recording devices of the type illustrated in that figure. Additionally, a meter 88 may be provided to measure the automatic volume control bias imposed upon the amplifier 82, the meter 88 constituting, therefore, a measuring device for the losses in the system.

Considering the mechanical arrangement of Figure 3 in association with the electrical connections illustrated in Figure 5, it will be evident that the combination provides an oscillator generating sustained audio oscillations. From the description of the feed back considerations above made with respect to Figure 1, it will be evident that by proper choice of the filtering arrangements in the amplifier 82, the oscillation-sustaining gain may be confined to a particular band of frequencies. The moving mechanical parts in Figure 3, taken in conjunction with the stratum adjacent thereto, constitute a mechanical oscillating system and, by the proper choice of the band pass filter, the oscillations maintained in this system may be those most characteristic of the effects on the system of the stratum adjacent thereto at any particular time. More particularly, if the rod 50 and the diaphragm 68 to which it is connected are driven by the loud speaker motors, it will be evident that these mechanical parts alone do not constitute the oscillating system. This oscillating system includes additionally the mud surrounding the casing 56 and the stratum surrounding the casing. With the internal mechanical system substantially constant, and the mud also substantially constant, at a given depth, it will be evident that the mechanical system has ampedance characteristics dependent largely upon the stratum in the immediate vicinity of the diaphragms 58. By the proper choice of the pass band of the filter, the characteristics of the stratum passed by the diaphragms will determine the changes in the frequency of vibration of the system, as well as the losses. The frequencies of vibration are indicated by the meter 90. The losses, depending largely upon the porosity characteristics of the strata, are indicated by the meter 88, which serves as a measure of the degree of amplification necessary to maintain the oscillations at constant amplitude. The meters 88 and 90 will generally give different curves against depth, since the frequency and energy absorption are not dependent upon precisely the same characteristics of the rock.

It will be evident that the band pass filter must particularly exclude those frequencies of oscillation which are dependent upon the mechanical system alone, the mechanical system considered in conjunction with the mud alone and the mechanical system considered in conjunction with the mud and reflection characteristics of the strata alone. If desired, however, the pass band may be so chosen as to give responses primarily due to the last combination, since various rocks differ considerably in their reflecting ability and change of phase at the reflecting interface will control the frequency of oscillation, as will be evident from the discussion in connection with Figure 1.

In the case of Figure 4, the system is essentially the same, except that while the vibratory characteristics are dependent upon the stratum to a large degree, the feed back is affected by sound passage through the stratum rather than by pick up from a mechanical connection such as 60 between the diaphragms 58 in Figure 3. There enters into Figure 4, to a slight extent, the velocity of transmission through the stratum adjacent the vibrating elements, so that the frequency and absorption characteristics may be somewhat different from the arrangement of Figure 3 even when the apparatus lies in the same stratum. As in all logging methods, however, differences in strata are of primary importance, and consequently either arrangement will give logs containing valuable information. From trials of either type of apparatus through known strata, it is possible to arrive at conclusions of the type of strata which may give rise to particular absorption and frequency characteristics in the system.

It will be evident that an arrangement similar to that of Figure 5 providing an automatic volume control of the output of a loud speaker may be provided in the arrangement of Figure 2 so as to secure by measurement of the action of the automatic volume control an indication of the losses occasioned by the earth through which the acoustic waves pass.

It will be evident that the oscillations produced in the strata need not be in the audible range, but may be of relatively low frequency or of supersonic frequencies, and it will be understood that reference to acoustic waves herein is inclusive of waves outside the range of ordinary sound. In the case of the use of supersonic waves, they may be generated, for example, by means of quartz plates in the place of diaphragms such as 58 and 72, and pickup may be effected by the use of similar crystals of piezoelectric type. In the case of such supersonic waves, the operation may be controlled to effect the existence of standing waves, the nature of which will be dependent upon the reflection or other characteristics of the strata encountered.

What I claim and desire to protect by Letters Patent is:

1. Bore hole logging apparatus comprising means for generating acoustic waves in strata surrounding a bore hole, means comprising amplifying feed back devices forming, with said generating means and the strata, a system providing sustained oscillations having at least one substantial sinusoidal component, said system having variations in its operating characteristics depending upon the strata, said feed back devices being frequency-selective to sustain oscillations only of significant character, and means for indicating the variations of said characteristics with the strata.

2. Bore hole logging apparatus comprising means for generating acoustic waves in strata surrounding a bore hole, means comprising amplifying feed back devices forming, with said generating means and the strata, a system providing sustained oscillations having at least one substantial sinusoidal component, said system having variations in its operating characteristics depending upon the strata, and means for indicating the variations of said characteristics with the strata.

3. Bore hole logging apparatus comprising means for generating acoustic waves in strata surrounding a bore hole, means comprising amplifying feed back devices forming, with said generating means and the strata, a system providing sustained oscillations having at least one substantial sinusoidal component, said system having variations in its operating characteristics depending upon the velocity of transmission of acoustic waves through the strata, and means for indicating the variations of said characteristics with the strata.

4. Bore hole logging apparatus comprising means for generating acoustic waves in strata surrounding a bore hole, means comprising amplifying feed back devices forming, with said generating means and the strata, a system providing sustained oscillations having at least one substantial sinusoidal component of substantially constant amplitude, said amplifying feed back devices including means for maintaining said amplitude substantially constant, and means for indicating the changes of the action of the last means with the strata.

5. Bore hole logging apparatus comprising means for generating acoustic waves in strata surrounding a bore hole, means comprising amplifying feed back devices forming, with said generating means and the strata, a system providing sustained oscillations having at least one substantial sinusoidal component varying in frequency depending upon the strata, and means for indicating the frequency variations.

6. Bore hole logging apparatus comprising means for generating acoustic waves in strata surrounding a bore hole, means comprising amplifying feed back devices forming, with said generating means and the strata, a system providing sustained oscillations having at least one substantial sinusoidal component varying in frequency depending upon the velocity of transmission of acoustic waves through the strata, and means for indicating the frequency variations.

7. Bore hole logging apparatus comprising means for generating acoustic waves in strata surrounding a bore hole, means comprising amplifying feed back devices forming, with said generating means and the strata, a system providing sustained oscillations having at least one substantial sinusoidal component of substantially constant amplitude and varying in frequency depending upon the strata, said amplifying feed back devices including means for maintaining said amplitude substantially constant, and means for indicating the changes of the action of the last means and of the frequency with the strata.

8. Bore hole logging apparatus comprising means for generating acoustic waves in strata surrounding a bore hole, means comprising amplifying feed back devices and a pick up means spaced from the generating means forming, with said generating means and the strata, a system providing sustained oscillations having at least one substantial sinusoidal component, said system having variations in its operating characteristics depending upon the strata, and means for indicating the variations of said characteristics with the strata.

GEORGE A. SMITH.